Patented June 6, 1939

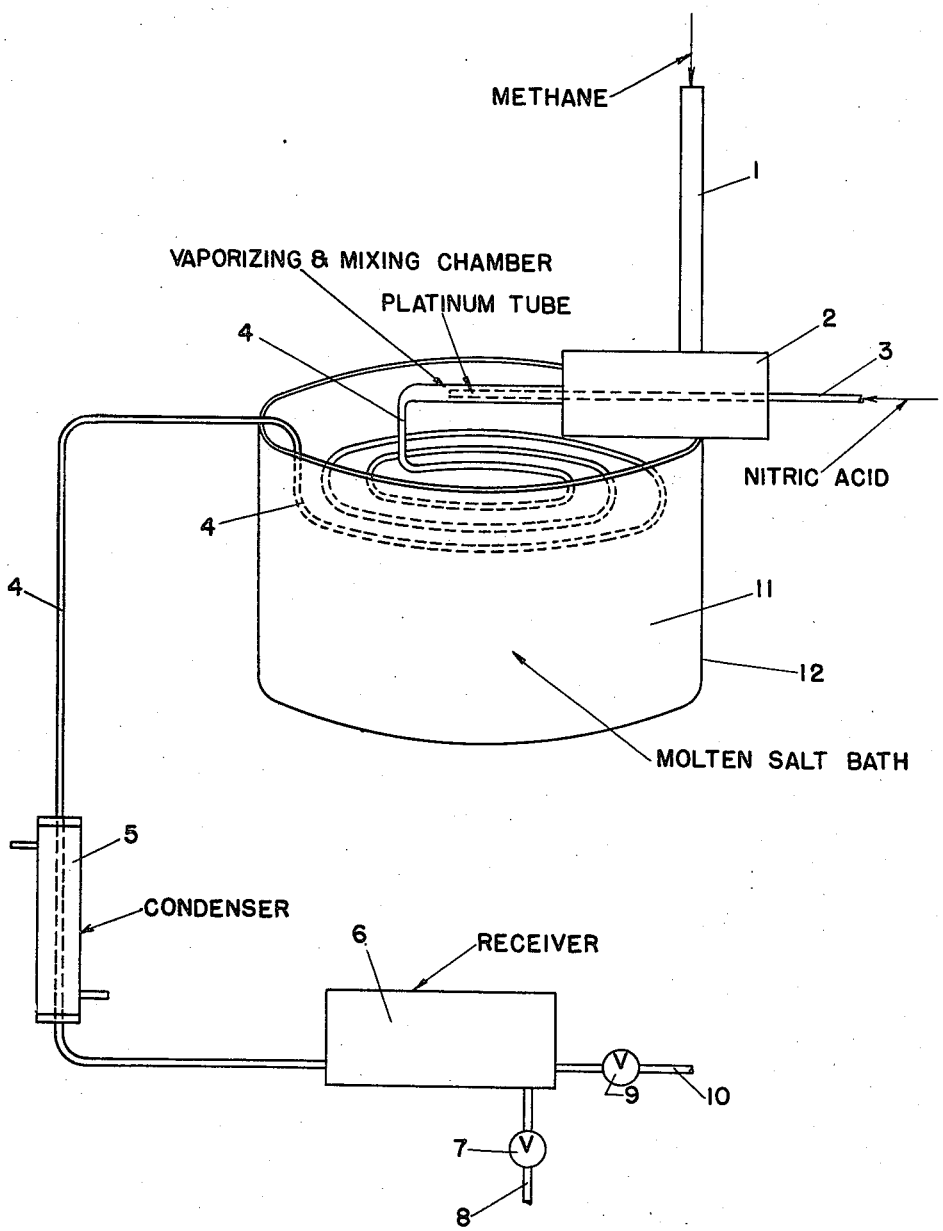

2,161,475

UNITED STATES PATENT OFFICE 2,161,475

PROCESS OF NITRATING METHANE

George K. Landon, Wilmington, Del., assignor to Hercules Powder Company, Wilmington, Del., a corporation of Delaware Application August 2, 1938, Serial No. 222,580

5 Claims. (Cl. 260—644)

This invention relates to the nitration of methane for formation of nitromethane.

Heretofore it has been known to nitrate paraffin hydrocarbons having from 3 to 8 carbon atoms, e. g., according to the process disclosed in United States Letters Patent No. 1,967,667. No attempt was made to use hydrocarbons having more than 8 carbon atoms, nor to use the simple hydrocarbons, such as methane or ethane, which have only primary carbon atoms. Later, it was disclosed in United States Letters Patent No. 2,071,122 that, by altering the conditions of nitration, ethane could be nitrated.

I have found that methane may be nitrated, by the use of aqueous nitric acid, very simply and with good yields, by the use of the process in accordance with this invention.

Specifically, my method of nitration of methane includes passing the reactants in the vapor state through the heated reaction zone at high velocity. If desired, the reaction may be carried out at elevated pressures, for example, within the range of from atmospheric pressure to about 800 lbs. gage pressure, so that the apparatus may be smaller for a given output and so that the products of the reaction can be condensed out without the use of refrigeration or scrubbing with water. I have found that the maximum obtainable yield of the reaction is approximately the same at atmospheric pressure as at pressures of 100 to 200 pounds per square inch, but that at the higher pressure the products of reaction can be condensed out at ordinary temperatures. Furthermore, the contact time for maximum yield is shorter at elevated pressures than at atmospheric pressure.

The reaction vessel may be of any material which will withstand the necessary temperature and the corrosive action of the reactants and reaction products but I have found it desirable, although not essential, to use for the parts which come into contact with the reactants at elevated temperatures a material other than a ferrous metal. For example, a stainless steel surface in the reaction chamber tends to lower the proportion of the nitric acid converted to nitromethane, probably by catalyzing the thermal decomposition of nitromethane. Thus, the stainless steel surface appears to have a negative catalytic effect on the reaction. The deleterious effects of stainless steel on the reaction can be minimized by feeding along with the acid a little sodium or potassium nitrate which forms a coating over the internal stainless steel surfaces and provides a relatively inert surface for contact with the reacting gases.

Suitable materials for the construction of the reaction vessel, which have substantially no negative catalytic effect on the reaction and which are not susbtantially corroded by the reactants and reaction products are, for example, glass, glass-lined vessels, fused silica, fused silica-lined vessels, gold-lined vessels, etc.

If adequate temperature control in the reaction chamber is not maintained, lower yields will result. When the reaction vessel is a long, narrow tube immersed in a molten salt bath maintained at the desired reaction temperature entirely satisfactory control is obtained. However, the long, narrow tube has the disadvantage of a high ratio of surface area to volume, whereby the effect of less desirable materials of construction, such as stainless steel, is magnified until in an extremely long and extremely narrow tube of, for example, less than ¼" diameter, only traces of nitromethane may be obtained. If the reaction vessel is made shorter and of larger diameter, the effect of stainless steel is minimized, but temperature control suffers because the available surface is not large enough to remove the heat of reaction unless the temperature in the reaction vessel rises, which causes decomposition of the nitromethane if the temperature rise is excessive. I have found, however, that temperature control can be obtained even in the short and larger diameter reaction vessels, if part of the methane is led into the reaction vessel at a point between the entrance where preheated methane and nitric acid enter and the exit where the products of reaction leave. This part of the methane is led in at a temperature below the reaction temperature in such quantity that excessive temperature rise in the reaction chamber is prevented.

Methane is far les reactive than ethane or the higher homologs, and nitromethane is comparatively unstable at the high temperatures necessary for its formation, hence in nitration of methane higher temperatures and shorter contact times are required than in nitration of ethane.

In nitration of ethane, the best yield is obtained at a reaction temperature of about 352° C. and a contact time of the reactants at this temperature of about 9.7 seconds. Attempts to use the above conditions in nitrating methane were unsuccessful.

The method, heretofore used, of vaporizing nitric acid by bubbling the hydrocarbon through a body of nitric acid held at constant temperature makes it difficult, if not impossible, to feed to the reaction zone anything except a constant boiling mixture, and high pressures are impossible, because vaporization is prevented unless the nitric acid be raised to a temperature dangerous from the explosive point of view. My improved method avoids these disadvantages.

As a specific example of the carrying out of my process I pass methane, preheated to a temperature of, for example, about 500° C. to about 700° C., into a small chamber, through which passes a small diameter tube carrying aqueous nitric acid under pressure said tube being preferably constructed of platinum or gold, or lined and coated therewith, said nitric acid thus being converted into vapor and escaping from the extremity of said tube into the heated methane and mixing therewith. The mixture of nitric acid vapor and methane may be maintained in the proportion of about 2 to 70 mols $CH_4$ per mol of $HNO_3$, preferably about 1 mol $HNO_3$ to 10 mols $CH_4$. This mixture is then passed, at a velocity represented by a contact time at the reaction temperature of about 0.005 to 1.0 second, depending upon the temperature and pressure of the reaction zone, into and through the reaction zone or apparatus comprised, for example, of Pyrex glass, or fused silica, a suitable metal lined with Pyrex glass, silica, gold, or any other inert and temperature resistant material, maintained at a temperature within the range of about 375° C. to about 550° C., preferably about 420° C. to about 460° C., thence to any suitable condenser and receiver.

As a specific example of the process in accordance with my invention, using a salt bath temperature of 450 C., a molar ratio of $1HNO_3:10CH_4$, a contact time of 0.09 second and a pressure of 100 pounds gage, I obtained nitromethane at a yield of 8.8%, by weight, based on total nitric acid supplied to the reactor.

Further to explain the process in accordance with my invention, reference is made to the accompanying drawing in which 1 represents a tube through which is passed methane, heated, for example, to about 500-700° C. by a heater (not shown), passing into receiver 2, which surrounds and heats platinum pipe 3, through which passes nitric acid, e. g., of 35-40% concentration. The methane passes then into Pyrex glass coiled tube 4, and mixes with the vapors of nitric acid escaping from the end of the tube 3, the mixture then passing through the remainder of coil 4 immersed in a bath of molten salt mixture comprising equal parts of $KNO_3$ and $NaNO_3$, maintained at a temperature of, for example, 440-460° C., thence through condenser 5 and to receiver 6, where the liquid products, mainly nitromethane and nitric acid, collect and may be drawn off via valve 7 and pipe 8, while the gas products, mainly unreacted methane and nitrogen oxides, pass off via valve and pipe 10 for recovery or waste.

The bath of molten salt, 11, contained in any suitable vessel, 12, is maintained at the desired temperature by direct heating, submerged electrical heating units, or in any suitable manner.

Preferably, I maintain a pressure upon the reactants of about 100 lbs. to about 800 lbs.

This application forms a continuation-in-part of my application Serial No. 184,386, filed January 11, 1938.

What I claim and desire to protect by Letters Patent is:

1. The process of nitrating methane which includes producing contact between methane and nitric acid in the vapor phase in a reaction vessel having a ferrous inner surface and having a ratio of surface area to volume less than that of a ¼" tube, at a temperature within the range of about 375° C. to about 550° C. and at a contact time in the reaction zone within the range of about 1.0 seconds to about 0.005 seconds, rapidly removing the reaction mixture from the reaction zone, and cooling it.

2. The process of nitrating methane which includes producing contact between methane and nitric acid in the vapor phase in a reaction vessel having a stainless steel inner surface and having a ratio of surface area to volume less than that of a ¼" tube, at a temperature within the range of about 375° C. to about 550° C. and at a contact time in the reaction zone of about 1.0 second to about 0.005 second, rapidly removing the reaction mixture from the reaction zone and cooling it.

3. The process of nitrating methane which includes producing contact between methane and nitric acid in the vapor phase in a reaction vessel having a stainless steel inner surface and having a ratio of surface area to volume less than that of a ¼" tube, at a temperature within the range of about 375° C. to 550° C., the time of contact being within the range of 1.0 second at about 375° C. to 0.005 second at about 550° C., rapidly removing the reaction mixture from the reaction zone and cooling it.

4. The process of nitrating methane which includes producing contact between preheated methane and nitric acid in the vapor phase in a reaction vessel having a ferrous inner surface and having a ratio of surface area to volume less than that of a ¼" tube, while maintaining the temperature within the reaction zone within the range of about 375° C. to about 550° C. by bleeding into the reaction zone methane at a temperature below reaction temperature, rapidly removing the reaction mixture from the reaction zone and cooling it.

5. The process of nitrating methane which includes producing contact between preheated methane and nitric acid in the vapor phase in a vessel having a stainless steel inner surface and having a ratio of surface to volume less than that of a ¼" tube, at a temperature within the range of about 375° C. to about 550° C. for a period of time wtihin the range of about 1.0 second to about 0.005 second, while controlling the reaction temperature within the said range by bleeding into the reaction zone methane at a temperature below reaction temperature, rapidly removing the reaction mixture from the reaction zone and cooling it.

GEORGE K. LANDON.